US012562759B2

(12) United States Patent
Uejima et al.

(10) Patent No.: US 12,562,759 B2
(45) Date of Patent: Feb. 24, 2026

(54) RADIO-FREQUENCY CIRCUIT AND COMMUNICATION DEVICE

(71) Applicant: Murata Manufacturing Co., Ltd., Kyoto (JP)

(72) Inventors: Takanori Uejima, Kyoto (JP); Kenji Tahara, Kyoto (JP); Hiroyuki Nagamori, Kyoto (JP); Takahiro Katamata, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 349 days.

(21) Appl. No.: 18/517,294

(22) Filed: Nov. 22, 2023

(65) Prior Publication Data

US 2024/0097719 A1　　Mar. 21, 2024

Related U.S. Application Data

(63) Continuation of application No. PCT/JP2022/017185, filed on Apr. 6, 2022.

(30) Foreign Application Priority Data

May 26, 2021　　(JP) ................................. 2021-088693

(51) Int. Cl.
　　*H04B 7/00*　　　(2006.01)
　　*H04B 1/00*　　　(2006.01)
(52) U.S. Cl.
　　CPC ........... *H04B 1/0078* (2013.01); *H04B 1/006* (2013.01)
(58) Field of Classification Search
　　CPC .... H04B 1/0078; H04B 1/0057; H04B 1/006;

H04B 1/0064; H04B 1/401; H04B 1/44; H04B 7/0602; H03H 2/003; H03H 2007/013; H03H 7/0161
See application file for complete search history.

(56) References Cited

U.S. PATENT DOCUMENTS 10,673,470 B2 * 6/2020 Lee ........................ H04B 1/005
2015/0303973 A1 10/2015 Wloczysiak
2016/0050665 A1 2/2016 Chang et al.
(Continued)

FOREIGN PATENT DOCUMENTS

JP 　　2015-208007 A 　　11/2015
JP 　　2016-042696 A 　　3/2016
(Continued)

OTHER PUBLICATIONS

International Search Report for PCT/JP2022/017185 dated Jul. 5, 2022.

*Primary Examiner* — Tuan Pham
(74) *Attorney, Agent, or Firm* — McDonald Hopkins LLC

(57) ABSTRACT

A radio-frequency circuit includes an antenna connection terminal, switch circuits, a duplexer, a low-pass filter, and a high-pass filter. The switch circuit includes a port connected to the antenna connection terminal and ports. The switch circuit includes a single transmission port connected to the port, a simultaneous transmission port connected to ports. The duplexer is connected to the port. The low-pass filter is disposed on a signal path connecting the port and the simultaneous transmission port. The high-pass filter is connected to the port. No filter is disposed on a signal path connecting the port and the single transmission port.

17 Claims, 9 Drawing Sheets

(56)        References Cited

U.S. PATENT DOCUMENTS

| 2018/0048308 | A1  | 2/2018  | Oshita et al. | |
| 2018/0241369 | A1* | 8/2018  | Ghim | H04W 72/0453 |
| 2019/0356344 | A1  | 11/2019 | Takada | |
| 2020/0154434 | A1* | 5/2020  | Balteanu | H03F 1/565 |

FOREIGN PATENT DOCUMENTS

| JP | 2018-107788 A | 7/2018  |
| JP | 2019-205007 A | 11/2019 |

* cited by examiner

< SINGLE TRANSMISSION MODE >

< SIMULTANEOUS TRANSMISSION MODE >

< SINGLE TRANSMISSION MODE >

< SIMULTANEOUS TRANSMISSION MODE >

RADIO-FREQUENCY CIRCUIT AND COMMUNICATION DEVICE

CROSS REFERENCE TO RELATED APPLICATION

This is a continuation of International Application No. PCT/JP2022/017185 filed on Apr. 6, 2022 which claims priority from Japanese Patent Application No. 2021-088693 filed on May 26, 2021. The contents of these applications are incorporated herein by reference in their entireties.

BACKGROUND ART

Technical Field

The present disclosure relates to a radio-frequency circuit and a communication device.

Radio-frequency circuits used for communication using a plurality of frequency bands (multiband) and a plurality of radio systems (multimode) (hereinafter abbreviated as multiband communication) are known in the related art.

For example, Patent Document 1 discloses a radio-frequency circuit that includes a multiplexer formed of a plurality of filters having different passbands and provides isolation between radio-frequency signals in respective frequency bands.

Patent Document 1: Japanese Unexamined Patent Application Publication No. 2019-205007

BRIEF SUMMARY

A radio-frequency circuit disclosed in Patent Document 1 may deteriorate communication performance when simultaneously transmitting radio-frequency signals in a plurality of frequency bands.

The present disclosure provides a radio-frequency circuit and a communication device with which the deterioration of radio-frequency signal communication performance can be suppressed.

A radio-frequency circuit according to an aspect of the present disclosure includes an antenna connection terminal, a first switch circuit, a second switch circuit, a first filter having a first frequency band as a passband, a second filter that has the first frequency band as at least a part of a passband and has a second frequency band including a second frequency that is n times (n is a natural number greater than or equal to two) a first frequency in the first frequency band as a stop band, and a third filter having a third frequency band including the second frequency as a passband. The first switch circuit includes a first port connected to the antenna connection terminal and a second port, a third port, and a fourth port that are capable of being switched between conduction and non-conduction with respect to the first port. The second switch circuit includes a single transmission port connected to the second port, a simultaneous transmission port connected to the third port, and an input/output port capable of being switched between conduction and non-conduction with respect to the single transmission port and the simultaneous transmission port. The first filter is connected to the input/output port. The second filter is disposed on a first signal path connecting the third port and the simultaneous transmission port. The third filter is connected to the fourth port. No filter is disposed on a second signal path connecting the second port and the single transmission port.

A communication device according to an aspect of the present disclosure includes an RF signal processing circuit configured to process a radio-frequency signal transmitted/received by an antenna and the above radio-frequency circuit. The radio-frequency circuit is configured to transmit the radio-frequency signal between the antenna and the RF signal processing circuit.

With a radio-frequency circuit according to the present disclosure and a communication device according to the present disclosure, the deterioration of communication performance can be suppressed.

DETAILED DESCRIPTION

Figure 1:
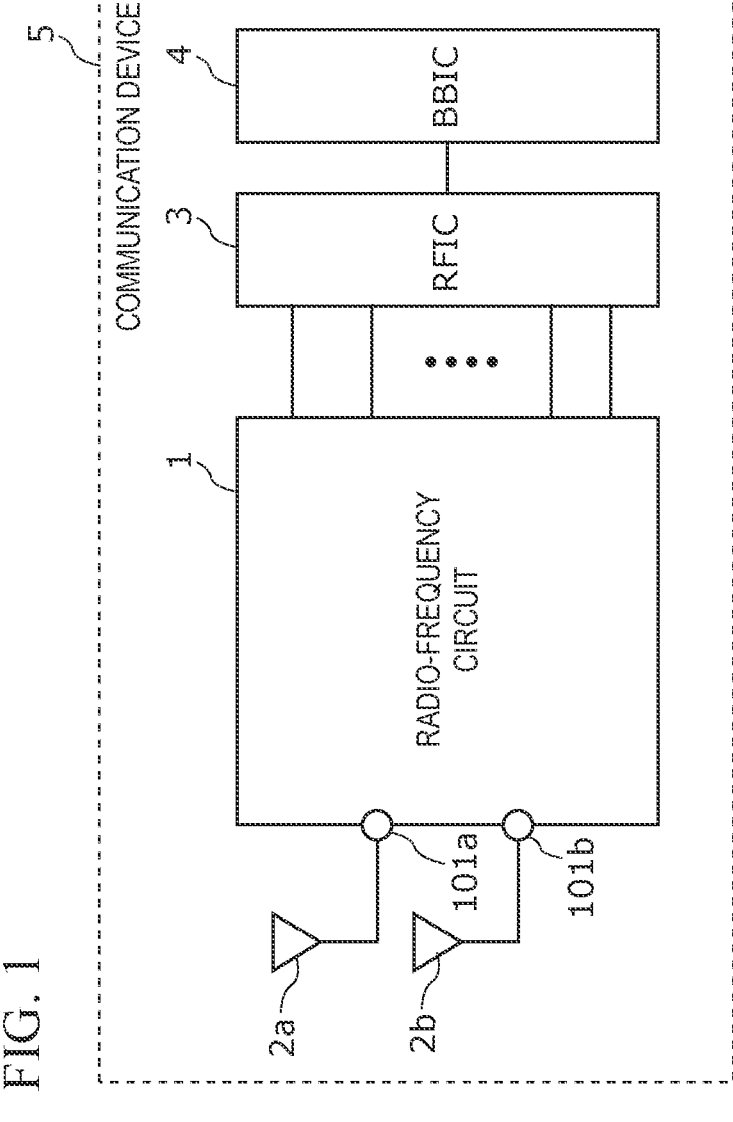
FIG. 1 is a diagram illustrating the configuration of a communication device according to a first embodiment.

A radio-frequency circuit according to an embodiment of the present disclosure will be described in detail below with reference to drawings. The embodiments to be described below each illustrates a specific example of the present disclosure. Accordingly, the numerical values, shapes, materials, constituent elements, arrangements of the constituent elements, the ways in which the constituent elements are connected, steps, the order of the steps, and so forth described in the following embodiments are merely examples and are not intended to limit the present disclosure. Accordingly, constituent elements not described in the independent claims among constituent elements in the following embodiments are described as optional constituent elements.

The drawings are schematic drawings and are not necessarily illustrated in a strictly accurate manner. Accordingly, for example, the scales and so forth in the respective drawings are not necessarily the same. Furthermore, in the drawings, configurations that are substantially the same as each other are denoted by the same symbols and repeated description thereof is omitted or simplified.

In this specification, the meaning of "connected" includes not only directly connected with connection terminals and/or wiring conductors, but also electrical connections established via other circuit elements. Furthermore, "connected between A and B" means connected to both A and B between A and B.

In this specification, ordinal numbers, such as "first" and "second" do not mean the number or order of constituent elements unless otherwise stated, and rather are used for the purpose of avoiding confusion and distinguishing between constituent elements of the same type.

First Embodiment 1-1. Configuration

Figure 2:
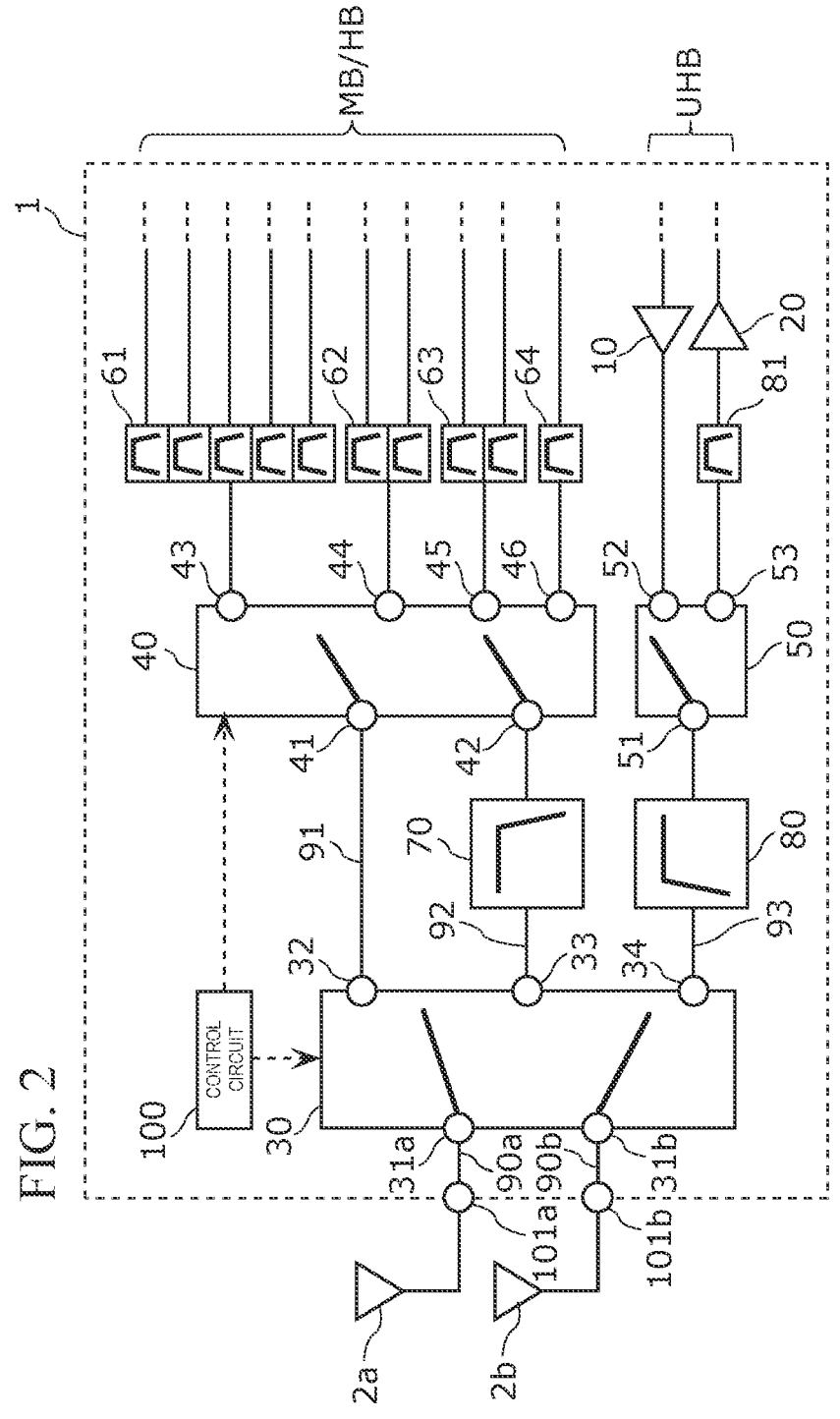
FIG. 2 is a circuit diagram of a radio-frequency circuit according to the first embodiment.

First, the configurations of a radio-frequency circuit according to the present embodiment and a communication device according to the present embodiment will be described with reference to FIGS. 1 and 2. FIG. 1 is a diagram illustrating the configuration of a communication device 5 according to the present embodiment. FIG. 2 is a circuit diagram of a radio-frequency circuit 1 according to the present embodiment.

1-1-1. Communication Device

First, the configuration of the communication device 5 will be described with reference to FIG. 1.

The communication device 5 illustrated in FIG. 1 is a device used in a communication system and is, for example, a mobile terminal such as a smartphone or a tablet computer. As illustrated in FIG. 1, the communication device 5 includes the radio-frequency circuit 1, antennas 2a and 2b, an RF signal processing circuit (RFIC) 3, and a baseband signal processing circuit (BBIC) 4.

The radio-frequency circuit 1 transmits a radio-frequency signal between each of the antennas 2a and 2b and the RFIC 3. The internal configuration of the radio-frequency circuit 1 will be described below.

The antenna 2a is an example of a first antenna connection terminal and is connected to an antenna connection terminal 101a of the radio-frequency circuit 1. The antenna 2b is an example of a second antenna connection terminal and is connected to an antenna connection terminal 101b of the radio-frequency circuit 1. Each of the antennas 2a and 2b transmits a radio-frequency signal output from the radio-frequency circuit 1. Each of the antennas 2a and 2b externally receives a radio-frequency signal and outputs the radio-frequency signal to the radio-frequency circuit 1.

The RFIC 3 is an example of a signal processing circuit for processing a radio-frequency signal. Specifically, the RFIC 3 performs signal processing such as down-conversion upon a radio-frequency reception signal input via the reception path of the radio-frequency circuit 1 and outputs a reception signal generated as a result of the signal processing to the BBIC 4. The RFIC 3 performs signal processing such as up-conversion upon a transmission signal input from the BBIC 4 and outputs a radio-frequency transmission signal generated as a result of the signal processing to the transmission path of the radio-frequency circuit 1.

The BBIC 4 is a baseband signal processing circuit for performing signal processing using an intermediate frequency band lower than the frequency of a radio-frequency signal transmitted by the radio-frequency circuit 1. Examples of a signal processed by the BBIC 4 include an image signal for image display and/or an audio signal for a call through a speaker.

In the communication device 5 according to the present embodiment, the antennas 2a and 2b and the BBIC 4 are optional constituent elements.

1-1-2. Configuration of Radio-Frequency Circuit

Next, the configuration of the radio-frequency circuit 1 will be described with reference to FIG. 2.

The radio-frequency circuit 1 illustrated in FIG. 2 can simultaneously transmit radio-frequency signals in a plurality of different frequency bands. Simultaneous transmission is at least one of simultaneous sending, simultaneous reception, or simultaneous sending/reception and is called carrier aggregation (CA) in some cases. In the present embodiment, the radio-frequency circuit 1 has a simultaneous transmission mode and a single transmission mode as operation modes.

For example, the radio-frequency circuit 1 can simultaneously transmit radio-frequency signals in the middle-high band (MHB) and the ultra-high band (UHB) in the simultaneous transmission mode. The radio-frequency circuit 1 transmits only one of a radio-frequency signal in the middle-high band and a radio-frequency signal in the ultra-high band in the single transmission mode.

Each of the middle-high band and the ultra-high band is a band group including a plurality of communication bands used for the transmission and reception of signals. A communication band is a frequency band defined in advance for a communication system by a standards group (e.g., 3GPP (3rd generation partnership project) or IEEE (institute of electrical and electronic engineers)). A communication system means a communication system constructed using a RAT (radio access technology). Examples of a communication system include the 5G-NR (5th generation new radio) system, the LTE (long term evolution) system, and the WLAN (wireless local area network) system, but a communication system is not limited thereto.

The middle-high band is a frequency band group having a frequency range 3 GHz and below. The middle-high band includes, for example, a communication band based on the FDD (frequency division duplex) system and a communication band based on the TDD (time division duplex) system. Specifically, the middle-high band includes, for example, Band B1 (transmission band: 1920-1980 MHz, reception band: 2110-2170 MHz), Band B2 (transmission band: 1850-1910 MHz, reception band: 1930-1990 MHz), Band B3 (transmission band: 1710-1785 MHz, reception band: 1805-1880 MHz), Band B7 (transmission band: 2500-2570 MHz, reception band: 2620-2690 MHz), Band B32 (reception band: 1452-1496 MHz), and B41 (transmission/reception band: 2496-2690 MHz) in 4G-LTE. Bands B1, B2, B3, and B7 are communication bands based on the FDD system. Band B41 is a communication band based on the TDD system.

The ultra-high band is a frequency band group having a frequency range 3 GHz and above and includes a communication band based on the TDD system. Specifically, the ultra-high band includes, for example, Band n77 (transmission/reception band: 3300-4200 MHz) and Band n79 (transmission/reception band: 4400-5000 MHz) in 5GNR. Bands n77 and n79 are communication bands based on the TDD system.

The radio-frequency circuit 1 may simultaneously transmit radio-frequency signals in a plurality of frequency bands included in the middle-high band. The radio-frequency circuit 1 may similarly simultaneously transmit radio-frequency signals in a plurality of frequency bands included in the ultra-high band. Thus, the combination of communication bands with which simultaneous transmission can be performed is not particularly limited, but simultaneous transmission mode means that a frequency signal in the middle-high band and a radio-frequency signal in the ultra-high band are simultaneously transmit in the following description. The single transmission mode means the transmission of a radio-frequency signal in only a single communication band included in one of the middle-high band and the ultra-high band, but means the transmission of a radio-frequency signal in the middle-high band unless otherwise noted in the following description.

As illustrated in FIG. 2, the radio-frequency circuit 1 includes a power amplifier 10, a low-noise amplifier 20, switch circuits 30, 40, and 50, a multiplexer 61, duplexers 62 and 63, a filter 64, a low-pass filter 70, a high-pass filter 80, a filter 81, and a control circuit 100. The radio-frequency circuit 1 includes at least on antenna connection terminal. Specifically, the radio-frequency circuit 1 includes the two antenna connection terminals 101a and 101b. Although not illustrated in FIG. 2, the radio-frequency circuit 1 includes a plurality of output terminals for outputting a radio-frequency reception signal to the RFIC 3 and a plurality of input terminals for receiving the input of a radio-frequency transmission signal from the RFIC 3.

The power amplifier 10 amplifies a radio-frequency transmission signal input from the RFIC 3 via the input terminal. Specifically, the power amplifier 10 amplifies a radio-frequency transmission signal in the ultra-high band. The output terminal of the power amplifier 10 is connected to a port 52 of the switch circuit 50.

The low-noise amplifier 20 amplifies a radio-frequency reception signal received by the antenna 2a or 2b. Specifically, the low-noise amplifier 20 amplifies a radio-frequency reception signal in the ultra-high band. The input terminal of the low-noise amplifier 20 is connected to a port 53 of the switch circuit 50.

Each of the power amplifier 10 and the low-noise amplifier 20 may be, for example, a multistage amplifier or a differential amplifier. Although not illustrated in FIG. 2, the radio-frequency circuit 1 includes one or more power amplifiers and one or more low-noise amplifiers for amplifying a radio-frequency signal in the middle-high band. These power amplifiers have the same configuration as the power amplifier 10, and these low-noise amplifiers have the same configuration as the low-noise amplifier 20.

The power amplifier 10 for amplifying a radio-frequency signal in the ultra-high band corresponds to Power Class 2 (the maximum output power: 26 dBm). On the other hand, a power amplifier (not illustrated) for amplifying a radio-frequency signal in the middle-high band corresponds to Power Class 2 or 3 (the maximum output power: 23 dBm).

A power class is a terminal output power classification defined by, for example, the maximum output power. The smaller the value of a power class, the higher the output power. The maximum output power is defined by output power at the antenna end of a terminal.

The switch circuit 30 is an example of a first switch circuit and includes ports 31a and 31b and three ports 32 to 34. The switch circuit 30 can switch between conduction and non-conduction between the port 31a and each of the ports 32 to 34 and between the port 31b and each of the ports 32 to 34.

The port 31a is an example of a first port and is connected to the antenna connection terminal 101a. In the present embodiment, no multiplexer is disposed on a signal path 90a connecting the port 31a and the antenna connection terminal 101a. Specifically, the port 31a and the antenna connection terminal 101a are directly connected.

The port 31b is an example of the first port and is connected to the antenna connection terminal 101b. In the present embodiment, no multiplexer is disposed on a signal path 90b connecting the port 31b and the antenna connection terminal 101b. Specifically, the port 31b and the antenna connection terminal 101b are directly connected.

The port 32 is an example of a second port and is connected to a single transmission port 41 of the switch circuit 40. In the present embodiment, no filter is disposed on a signal path 91 connecting the port 32 and the single transmission port 41. Specifically, the port 32 and the single transmission port 41 are directly connected. The signal path 91 is an example of a second signal path and is used for the transmission of a radio-frequency signal in the middle-high band in the single transmission mode.

The port 33 is an example of a third port and is connected to a simultaneous transmission port 42 of the switch circuit 40. In the present embodiment, the low-pass filter 70 is disposed on a signal path 92 connecting the port 33 and the simultaneous transmission port 42. The signal path 92 is an example of a first signal path and is used for the transmission of a radio-frequency signal in the middle-high band in the simultaneous transmission mode.

The port 34 is an example of a fourth port and is connected to a port 51 of the switch circuit 50. In the present embodiment, the high-pass filter 80 is disposed on a signal path 93 connecting the port 34 and the port 51. The signal path 93 is an example of a third signal path and is used for the transmission of a radio-frequency signal in the ultra-high band irrespective of an operation mode.

The switch circuit 30 is a combination circuit of an SPDT (single-pole double-throw)-type switch and an SPST (single-pole single-throw)-type switch. The SPDT switch includes the ports 31a, 32, and 33. The switch circuit 30 switches among three states: (a) the conduction between the ports 31a and 32 (the non-conduction between the ports 31a and 33), (b) the conduction between the ports 31a and 33 (the non-conduction between the ports 31a and 32), and (c) the non-conduction between the port 31a and each of the ports 32 and 33. The port 31a or 31b is not simultaneously connected (conducted) to the ports 32 and 33. The SPST-type switch includes the ports 31b and 34. The switch circuit 30 switches between conduction and non-conduction between the ports 31b and 34.

The ports 31a and 34 may form the SPST-type switch, and the ports 31b, 32, and 33 may from the SPDT-type switch. Each of the ports 31a and 31b may be capable of switching between the case where it forms the SPST-type switch and the case where it forms the SPDT-type switch. The port 31a or 31b may be capable of being simultaneously connected (conducted) to the port 34 and any one of the ports 32 and 33.

The switch circuit 40 is an example of a second switch circuit and includes the single transmission port 41, the simultaneous transmission port 42, and a plurality of ports 43 to 46. The switch circuit 40 is capable of switching between conduction and non-conduction between each of the multiple ports 43 to 46 and a selected one of the single transmission port 41 and the simultaneous transmission port 42.

The single transmission port 41 is used when the radio-frequency circuit 1 operates in the single transmission mode.

The simultaneous transmission port 42 is used when the radio-frequency circuit 1 operates in the simultaneous transmission mode.

Each of the ports 43 to 46 is an example of an input/output port capable of being switched between conduction and non-conduction with respect to the single transmission port 41 and the simultaneous transmission port 42. The port 43 is connected to the multiplexer 61. the port 44 is connected to the duplexer 62. The port 45 is connected to the duplexer 63. The port 46 is connected to the filter 64.

The switch circuit 40 is a multiple-connection switch circuit. Specifically, the switch circuit 40 switches between conduction and non-conduction between the single transmission port 41 and each of the ports 43 to 46. The switch circuit 40 also switches between conduction and non-conduction between the simultaneous transmission port 42 and each of the ports 43 to 46. The switch circuit 40 does not connect the port connected (conducted) to one of the single transmission port 41 and the simultaneous transmission port 42 among the ports 43 to 46 to the other one of the single transmission port 41 and the simultaneous transmission port 42. That is, each of the ports 43 to 46 is exclusively connected to only one of the single transmission port 41 and the simultaneous transmission port 42.

The switch circuit 40 may include the single transmission port 41, the simultaneous transmission port 42, and at least one of the ports 43 to 46. That is, the number of ports exclusively connected to the single transmission port 41 or the simultaneous transmission port 42 may be one, two, three, or five or more.

The switch circuit 50 is an example of a third switch circuit and includes the port 51 and the two ports 52 and 53. The switch circuit 50 is capable of switching between conduction and non-conduction between the port 51 and each of the ports 52 and 53.

The port 51 is an example of a fifth port and is connected to the port 34 of the switch circuit 30 via the high-pass filter 80.

The port 52 is an example of a six port and is connected to an output terminal of the power amplifier 10.

The port 53 is an example of a seventh port and is connected to an input terminal of the low-noise amplifier 20 via the filter 81.

The switch circuit 50 is an SPDT-type switch. Specifically, the switch circuit 50 exclusively connects the port 51 to any one of the ports 52 and 53.

The switch circuits 30, 40, and 50 may be formed of, for example, separate components or may be incorporated into a semiconductor integrated circuit. A semiconductor integrated circuit is an electronic circuit formed on the surface of a semiconductor chip (also called die) and in the semiconductor chip and is also called a semiconductor component. A semiconductor integrated circuit may be formed of, for example, a CMOS (complementary metal oxide semiconductor) and, specifically, is formed by an SOI (silicon on insulator) process. A semiconductor integrated circuit can therefore be manufactured at low cost. A semiconductor integrated circuit may be made of at least one of GaAs, SiGe, or GaN. A high-quality semiconductor integrated circuit can therefore be provided.

Each of the multiplexer 61, the duplexers 62 and 63, and the filter 64 includes an example of a first filter having a first frequency band as a passband. The first filter has a frequency band other than the first frequency band as a stop band. The first frequency band is a transmission band, a reception band, or a transmission/reception band in a communication band included in the middle-high band. The first filter is a bandpass filter having, as a passband, a transmission band, a reception band, or a transmission/reception band in a communication band included in the middle-high band. A radio-frequency transmission signal amplified by a power amplifier (not illustrated) is input to the first filter and is output to a corresponding port. Alternatively, a radio-frequency reception signal is input from a corresponding port to the first filter and output to a low-noise amplifier (not illustrated).

A passband is a frequency band in which a radio-frequency signal passes and a gain is greater than a predetermined value (e.g., −3 dB). A stop band is a frequency band in which the passage of a radio-frequency signal is suppressed and a gain is less than the predetermined value.

The multiplexer 61 includes the multiple first filters and demultiplexes and/or multiplexes different frequency bands in the FDD system. The multiplexer 61 includes, for example, five filters: a transmission filter and a reception filter in Band B1, a transmission filter and a reception filter in Band B3, and a reception filter in Band B32. A transmission filter has a transmission band (uplink operating band) in a corresponding communication band as a passband. A reception filter has a reception band (downlink operating band) in a corresponding communication band as a passband.

Each of the duplexers 62 and 63 includes the two first filters and demultiplexes and/or multiplexes different frequency bands in the FDD system. The duplexer 62 includes, for example, a transmission filter and a reception filter in Band B2. The duplexer 63 includes, for example, a transmission filter and a reception filter in Band B7.

The filter 64 is the first filter in a communication band in the TDD system. For example, the filter 64 has a transmission/reception band in Band B41 as a passband.

The passband of each filter is merely illustrative and can be changed as appropriate. For example, the combination of filters included in the multiplexer 61 is not limited to the above example. The radio-frequency circuit 1 does not necessarily have to include at least one of the multiplexer 61, the duplexer 62, the duplexer 63, or the filter 64.

The low-pass filter 70 is an example of a second filter having the first frequency band, which is the passband of the first filter, as at least a part of a passband and a second frequency band not overlapping the first frequency band as a stop band. The second frequency band includes a second frequency that is n times a first frequency in the first frequency band where n is a natural number greater than or equal to two. That is, the low-pass filter 70 suppresses the passage of an n-th harmonic of a radio-frequency signal passing through the first filter.

The low-pass filter 70 has a frequency band higher than the passband as the stop band. Specifically, the low-pass filter 70 has the middle-high band as the passband and the ultra-high band as the stop band. For example, the cutoff frequency of the low-pass filter 70 is included in a range 3 GHz and below. The low-pass filter 70 is disposed on the signal path 92 used for simultaneous transmission.

The high-pass filter 80 is an example of a third filter having a third frequency band including the second frequency as a passband. The third frequency band at least partly overlaps the ultra-high band. The high-pass filter 80 has a frequency band lower than a passband as a stop band. For example, the high-pass filter 80 has the ultra-high band as the passband and the middle-high band as the stop band. For example, the cutoff frequency of the high-pass filter 80 is included in the range 3 GHz and below.

The filter 81 is an example of a fourth filter and is disposed between the port 53 of the switch circuit 50 and the low-noise amplifier 20. The filter 81 is, for example, a bandpass filter having a transmission/reception band in Band n77 in the ultra-high band as the passband.

The first filters included in the multiplexer 61 and the duplexers 62 and 63, the filter 64, the low-pass filter 70, the high-pass filter 80, and the filter 81 may be, for example, surface acoustic wave (SAW) filters, acoustic wave filters using BAWs (bulk acoustic waves), LC resonant filters, or dielectric filters and are not limited thereto.

The control circuit 100 is formed of, for example, an LSI (large scale integration) that is an integrated circuit (IC). The control circuit 100 controls the switch circuits 30, 40, and 50. Specifically, the control circuit 100 controls switching between conduction and non-conduction between ports of respective switch circuits. A specific exemplary control will be described below.

The radio-frequency circuit 1 does not necessarily have to include the control circuit 100. The functions performed by the control circuit 100 may be performed by the RFIC 3 or another circuit. The radio-frequency circuit 1 may include an input terminal for receiving from, for example, the RFIC 3 a control signal for switching among the switch circuits 30, 40, and 50.

In the present embodiment, a plurality of circuit components included in the radio-frequency circuit 1 are disposed on the same substrate. For example, the switch circuits 30 and 40 and the low-pass filter 70 are disposed on the same substrate. On the same substrate, at least one of the high-pass filter 80, the switch circuit 50, the multiplexer 61, the duplexer 62, the duplexer 63, the filter 64, the filter 81, the power amplifier 10, the low-noise amplifier 20, or the control circuit 100 may be disposed. All components included in the radio-frequency circuit 1 may be disposed on the same substrate and modularized.

1-2. Operation

Next, the operation of the radio-frequency circuit 1 having the above configuration will be described. As described above, the radio-frequency circuit 1 has the single transmission mode and the simultaneous transmission mode as operation modes in the present embodiment.

1-2-1. Single Transmission Mode

Figure 3:
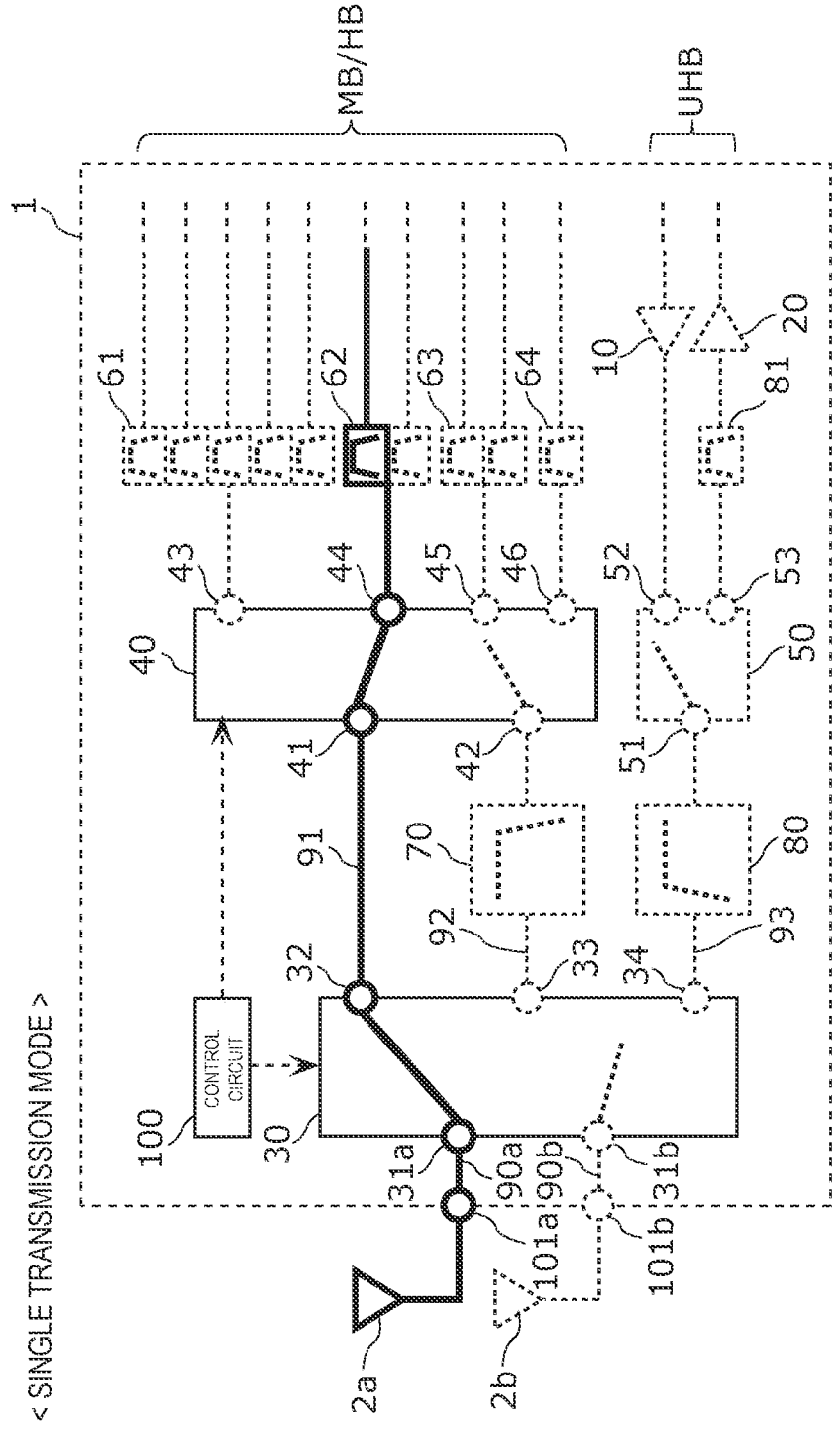
FIG. 3 is a circuit diagram illustrating an example of a signal path at the time of the operation of a radio-frequency circuit according to the first embodiment in a single transmission mode.

First, the single transmission mode will be described with reference to FIG. 3. FIG. 3 is a circuit diagram illustrating an example of a signal path at the time of the operation of the radio-frequency circuit 1 according to the present embodiment in the single transmission mode.

The single transmission mode is an operation mode in which the transmission of a radio-frequency signal in one of the communication bands included in the middle-high band is performed. FIG. 3 illustrates an exemplary case where the transmission of a radio-frequency signal in Band B2 is performed (specifically, a signal path passing through the duplexer 62 is used).

Referring to FIG. 3, a signal path used for transmission and terminals and filters on the signal path are represented by thick lines and, for example, signal paths, terminals, filters, and switch circuits that are not used are represented by broken lines. The same illustration method is used for FIGS. 4, 7, and 8 to be described below.

In the single transmission mode, the switch circuit 40 establishes conduction between the single transmission port 41 and any one of the multiple ports 43 to 46. For example, as illustrated in FIG. 3, the switch circuit 40 establishes conduction between the single transmission port 41 and the port 44 connected to the duplexer 62. At that time, the switch circuit 40 does not connect the simultaneous transmission port 42 to the ports 43 to 46 to establish non-conduction between them. The switch circuit 30 establishes conduction between ports 31a and 32. At that time, the switch circuit 30 does not connect the port 31b to the ports 32 to 34 to establish non-conduction between them.

The antenna 2a (the antenna connection terminal 101a) and the duplexer 62 are therefore connected via the signal path 91. A radio-frequency signal is transmitted through the signal path 91 on which no filter is disposed, and an insertion loss caused by a filter can therefore be reduced.

1-2-2. Simultaneous Transmission Mode

Figure 4:
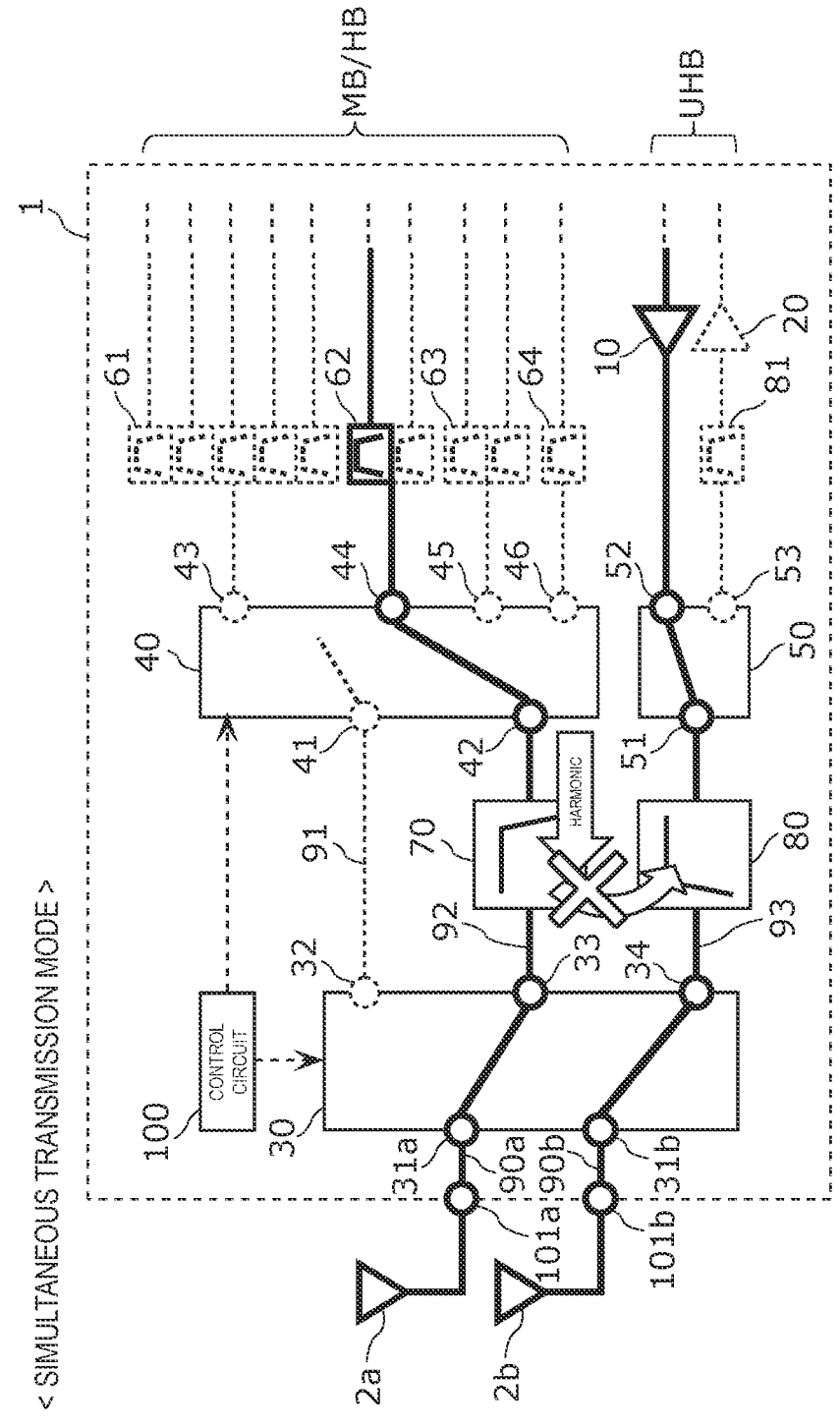
FIG. 4 is a circuit diagram illustrating an example of a signal path at the time of the operation of a radio-frequency circuit according to the first embodiment in a simultaneous transmission mode.

Next, the simultaneous transmission mode will be described with reference to FIG. 4. FIG. 4 is a circuit diagram illustrating an example of a signal path at the time of the operation of the radio-frequency circuit 1 according to the present embodiment in the simultaneous transmission mode.

In the simultaneous transmission mode, the simultaneous transmission of a radio-frequency signal in one of the communication bands included in the middle-high band and a radio-frequency signal in one of the communication bands included in the ultra-high band is performed. FIG. 4 illustrates an exemplary case where the simultaneous transmission (e.g., simultaneous sending) of radio-frequency signals in Bands B2 and n77 is performed.

In the simultaneous transmission mode, the switch circuit 40 establishes conduction between the simultaneous transmission port 42 and any one of the multiple ports 43 to 46. For example, the switch circuit 40 establishes conduction between the simultaneous transmission port 42 and the port 44 connected to the duplexer 62 as illustrated in FIG. 4. At that time, the switch circuit 40 does not connect the single transmission port 41 to the ports 43 to 46 to establish non-conduction between them.

The switch circuit 30 establishes conduction between the ports 31a and 33 and between the ports 31b and 34. The switch circuit 50 establishes conduction between the ports 51 and 52.

The antenna 2a (the antenna connection terminal 101a) and the duplexer 62 are therefore connected via the signal path 92. The antenna 2b (the antenna connection terminal 101b) and the power amplifier 10 are connected. Accordingly, the transmission of a radio-frequency signal in Band B2 from the antenna 2a and the transmission of a radio-frequency signal in Band n77 from the antenna 2b can be simultaneously performed. In the case where a radio-frequency signal in Band n77 is received, the switch circuit 50 may establish conduction between the ports 51 and 53. As a result, the simultaneous reception or simultaneous transmission/reception of radio-frequency signals in Bands B2 and n77 can be performed.

Since the low-pass filter 70 is disposed on the signal path 92, the low-pass filter 70 suppresses the passage of the harmonic of a radio-frequency signal in Band B2 passing through the duplexer 62. Accordingly, the turning of the harmonic to the signal path for the ultra-high band via the switch circuit 30 and/or the antennas 2a and 2b can be suppressed. Since the high-pass filter 80 is disposed on the signal path 93, the turning of, for example, a noise component included in a radio-frequency signal transmitted through the signal path 93 to the signal path for the middle-high band via the switch circuit 30 and/or the antennas 2a and 2b can be suppressed.

1-3. Effect

As described above, the radio-frequency circuit 1 according to the present embodiment includes the antenna connection terminal, the switch circuit 30, the switch circuit 40, the first filter having the first frequency band as a passband, the second filter that has the first frequency band as at least a part of a passband and has the second frequency band including the second frequency that is n times (n is a natural number greater than or equal to two) the first frequency in the first frequency band as a stop band, and the third filter having the third frequency band including the second frequency as a passband. The switch circuit 30 includes the port 31*a* connected to the antenna connection terminal and the ports 32 to 34 capable of being switched between conduction and non-conduction with respect to the port 31*a*. The switch circuit 40 includes the single transmission port 41 connected to the port 32, the simultaneous transmission port 42 connected to the port 33, and the ports 43 to 46 capable of being switched between conduction and non-conduction with respect to the single transmission port 41 and the simultaneous transmission port 42. The first filter is connected to one of the ports 43 to 46. The second filter is disposed on the signal path 92 connecting the port 33 and the simultaneous transmission port 42. The third filter is connected to the port 34. On the signal path 91 connecting the port 32 and the single transmission port 41, no filter is disposed. The second filter is, for example, the low-pass filter 70.

When the simultaneous transmission port 42 is used, the passage of an n-th harmonic can be suppressed by the use of the low-pass filter 70 and the turning of the harmonic to another signal path can be suppressed. Since no filter is disposed on the signal path 91, an insertion loss caused by a filter can be reduced when the single transmission port 41 is used. Thus, with the radio-frequency circuit 1, the deterioration of communication performance can be suppressed in both the case where the simultaneous transmission port 42 is used and the case where the single transmission port 41 is used.

For example, the radio-frequency circuit 1 includes a plurality of antenna connection terminals. The switch circuit 30 includes the two ports 31*a* and 31*b*. The multiple antenna connection terminals include the antenna connection terminal 101*a* connected to the port 31*a* and the antenna connection terminal 101*b* connected to the port 31*b*.

When the simultaneous transmission of radio-frequency signals in a plurality of communication bands is performed, the degree of isolation between the radio-frequency signals in the different communication bands can be increased because the two antennas 2*a* and 2*b* can be used.

For example, when the switch circuit 40 establishes conduction between the single transmission port 41 and at least one of the ports 43 to 46, the switch circuit 30 establishes conduction between the ports 31*a* and 32 and non-conduction between each of the ports 33 and 34 and both of the two ports 31*a* and 31*b*. When the switch circuit 40 establishes conduction between the simultaneous transmission port 42 and at least one of the ports 43 to 46, the switch circuit 30 establishes conduction between the ports 31*a* and 33, conduction between the ports 31*b* and 34, and non-conduction between the port 32 and both of the two ports 31*a* and 31*b*.

In the simultaneous transmission mode in which the simultaneous transmission port 42 is used, the turning of a harmonic can be suppressed by the use of the low-pass filter 70. In the single transmission mode in which the single transmission port 41 is used, a radio-frequency signal is transmitted through the signal path 91 on which no filter is disposed and an insertion loss caused by a filter can be reduced.

For example, the radio-frequency circuit 1 further includes the switch circuit 50 including the port 51 connected to the port 34 and the ports 52 and 53 capable of being switched between conduction and non-conduction with respect to the port 51. The third filter is disposed on the signal path 93 connecting the ports 34 and 51. The third filter is, for example, the high-pass filter 80.

Since the high-pass filter 80 is disposed on the signal path 93, the turning of, for example, a noise component included in a radio-frequency signal transmitted through the signal path 93 to another signal path via, for example, the switch circuit 30 can be suppressed.

For example, no multiplexer is disposed on the signal path 90*a* connecting the antenna connection terminal and the port 31*a* and the signal path 90*b* connecting the antenna connection terminal and the port 31*b*.

The reduction in an insertion loss caused by a multiplexer can therefore be suppressed.

For example, the first frequency band is at least a part of the first communication band for frequency division duplex (FDD). The third frequency band is the second communication band for time division duplex (TDD). For example, the first frequency band is included in a range 3 GHz and below. The second frequency band and the third frequency band are included in a range 3 GHz and above. For example, the switch circuits 30 and 40 and the low-pass filter 70 are disposed on the same substrate.

The simultaneous transmission of a radio-frequency signal in a communication band in the ultra-high band and a radio-frequency signal in a communication band in the middle-high band can be performed.

For example, the communication device 5 according to the present embodiment includes the RFIC 3 for processing radio-frequency signals transmitted/received by the antennas 2*a* and 2*b* and the radio-frequency circuit 1 for transmitting radio-frequency signals between each of the antennas 2*a* and 2*b* and the RFIC 3.

The deterioration of communication performance can therefore be suppressed.

1-4. Modification

Next, the modification of the first embodiment will be described with reference to FIG. 5.

Figure 5:
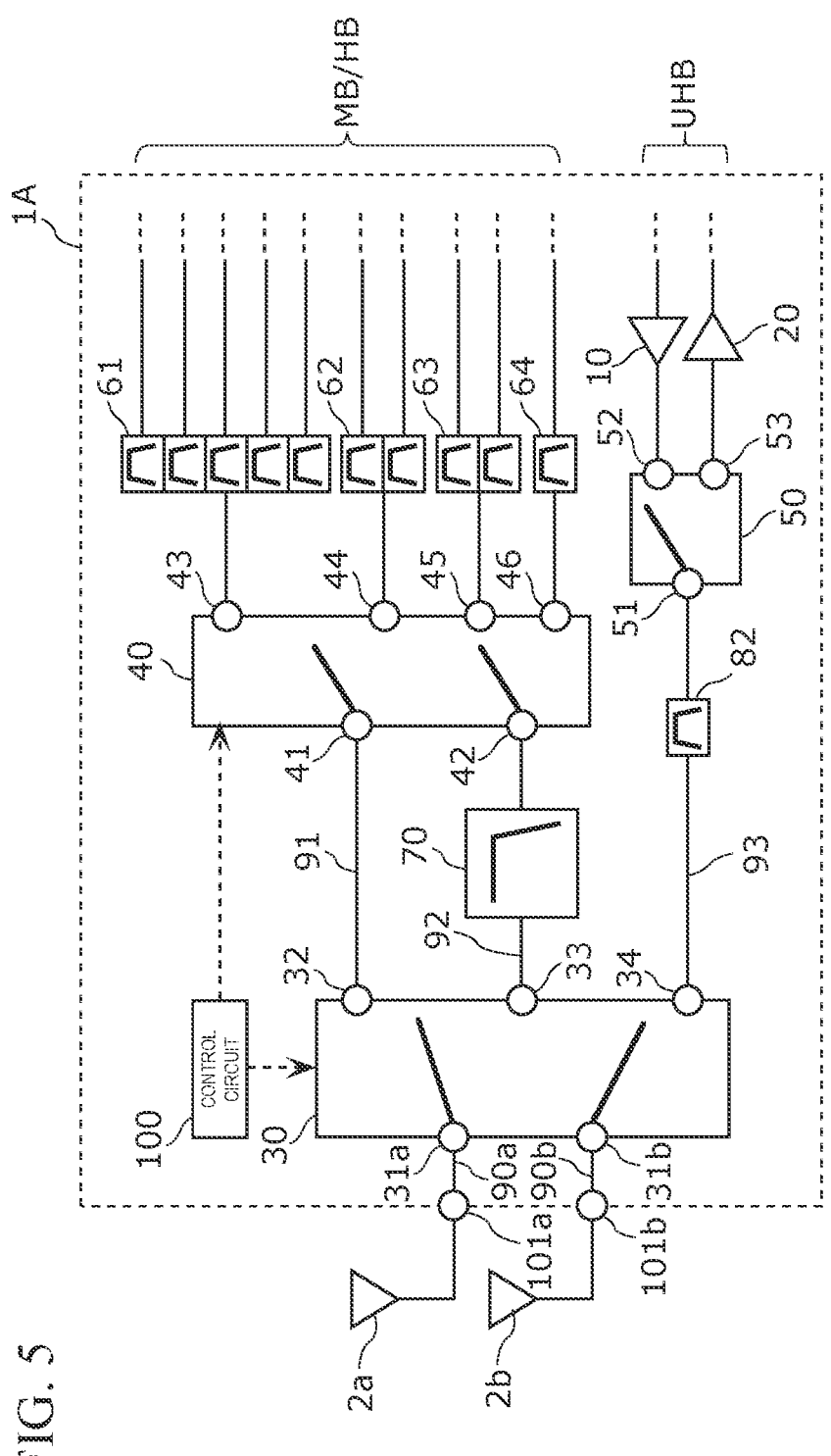
FIG. 5 is a circuit diagram of a radio-frequency circuit according to a modification of the first embodiment.

FIG. 5 is a circuit diagram of a radio-frequency circuit 1A according to the present modification. As illustrated in FIG. 5, the radio-frequency circuit 1A differs from the radio-frequency circuit 1 illustrated in FIG. 2 in that it does not include the high-pass filter 80 and the filter 81. The radio-frequency circuit 1A includes a bandpass filter 82.

The bandpass filter 82 is an example of the third filter and is disposed between the port 34 of the switch circuit 30 and the port 51 of the switch circuit 50. The bandpass filter 82 has, for example, a transmission/reception band in Band n77 in the ultra-high band as a passband. The bandpass filter 82 is a filter in the TDD system commonly used for transmission and reception.

Also in this case, the turning of a radio-frequency signal can be suppressed like in the radio-frequency circuit 1 according to the first embodiment, and the deterioration of communication performance can therefore be suppressed.

Second Embodiment

Next, the second embodiment will be described.

A radio-frequency circuit according to the second embodiment differs from the first embodiment in that it includes only one antenna connection terminal. The second embodiment will be described focusing on the difference between the first embodiment and the second embodiment, and the description of commonalities between them will be omitted or simplified.

2-1. Configuration

Figure 6:
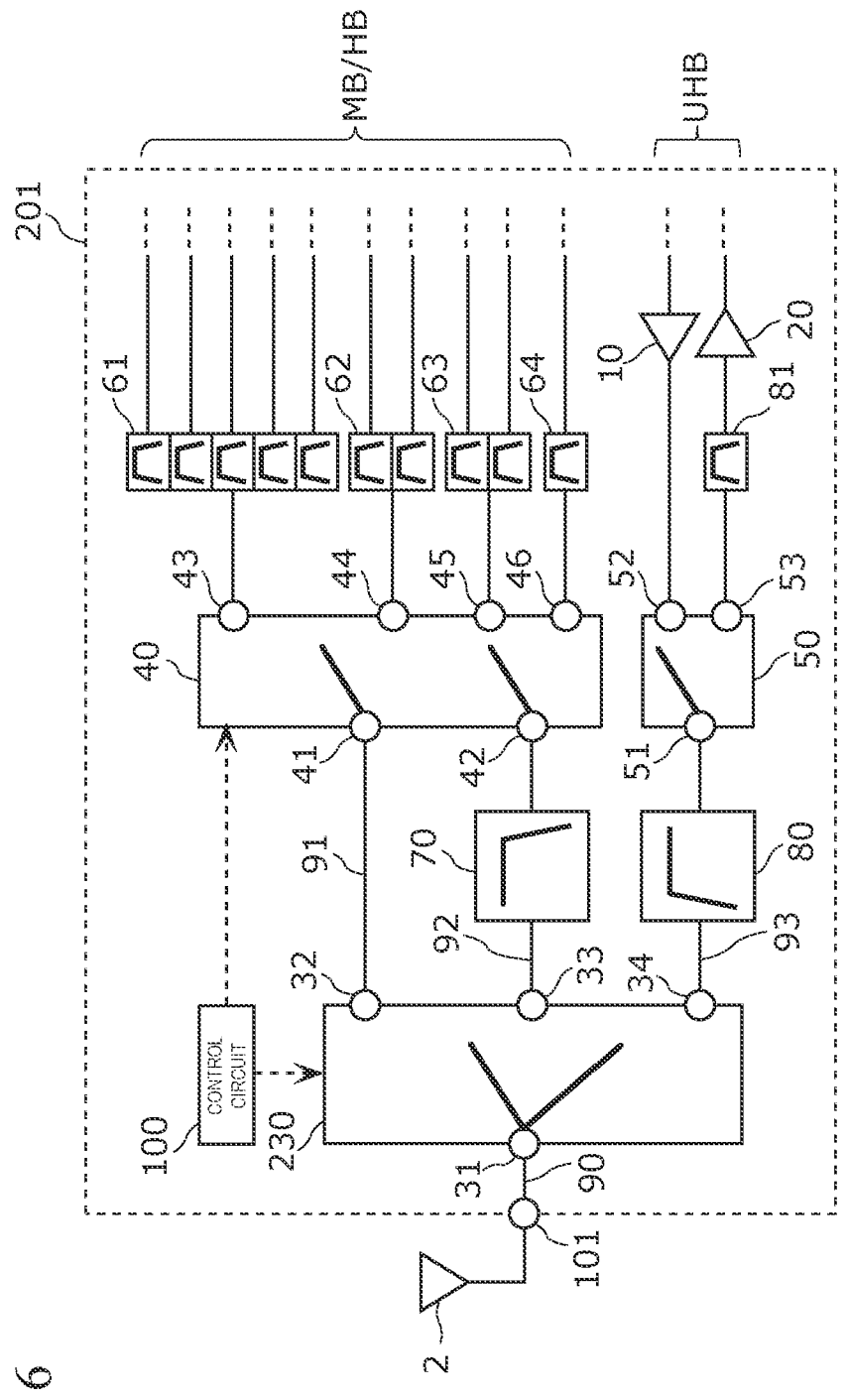
FIG. 6 is a circuit diagram of a radio-frequency circuit according to a second embodiment.

First, the circuit configuration of a radio-frequency circuit according to the present embodiment will be described with reference to FIG. 6. FIG. 6 is a circuit diagram of a radio-frequency circuit 201 according to the present embodiment.

As illustrated in FIG. 6, the radio-frequency circuit 201 includes a switch circuit 230 instead of the switch circuit 30 in the radio-frequency circuit 1 illustrated in FIG. 2. The radio-frequency circuit 201 includes a single (that is, only one) antenna connection terminal 101.

The antenna connection terminal 101 is connected to a single antenna 2.

The switch circuit 230 is an example of a first switch and includes a port 31 and the three ports 32 to 34. The port 31 is an example of the first port, and the ports 32 to 34 are the same as those in FIG. 1. No multiplexer is disposed on a signal path 90 connecting the port 31 and the antenna connection terminal 101. Specifically, the port 31 and the antenna connection terminal 101 are directly connected to each other.

The switch circuit 230 is a multiple-connection switch circuit. Specifically, the switch circuit 230 can switch between conduction and non-conduction between the port 31 and each of the ports 32 to 34. More specifically, the switch circuit 230 switches between three states: (a) the conduction between the ports 31 and 32 (the non-conduction between the port 31 and each of the ports 33 and 34), (b) the conduction between the ports 31 and each of the ports 33 and 34 (the non-conduction between the ports 31 and 32), and (c) the conduction between the ports 31 and 34 (the non-conduction between the port 31 and each of the ports 32 and 33. The port 31 is not simultaneously connected (conducted) to the ports 32 and 33. When the ports 34 and 31 are connected, the port 31 is not connected to the port 32.

The switching between conduction and non-conduction between the ports of the switch circuit 230 is performed under the control of the control circuit 100.

2-2. Operation

Next, the operation of the radio-frequency circuit 201 having the above configuration will be described. The radio-frequency circuit 201 has the single transmission mode and the simultaneous transmission mode as operation modes also in the present embodiment.

2-2-1. Single Transmission Mode

First, the single transmission mode will be described with reference to FIG. 7.

Figure 7:
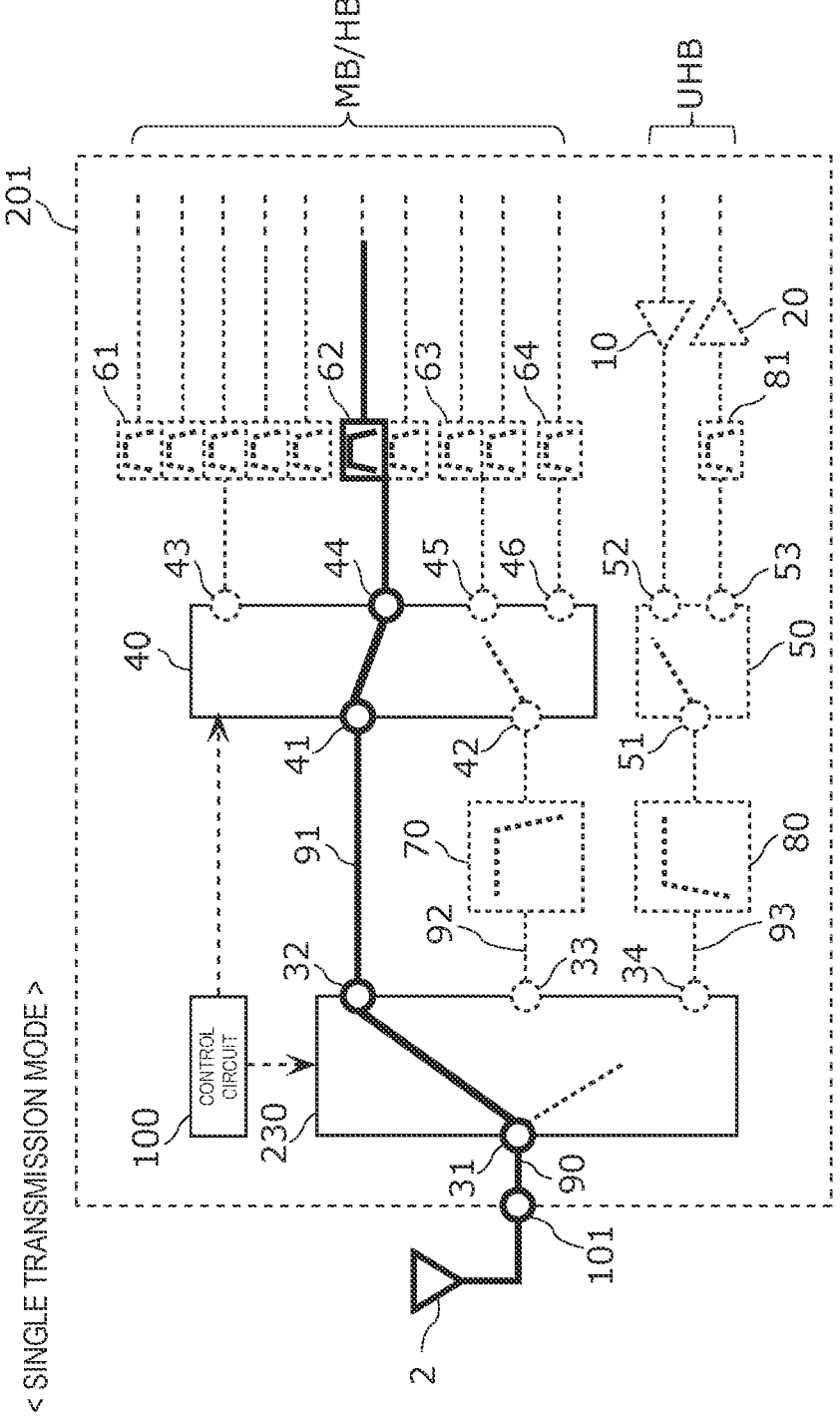
FIG. 7 is a circuit diagram illustrating an example of a signal path at the time of the operation of a radio-frequency circuit according to the second embodiment in the single transmission mode.

FIG. 7 is a circuit diagram illustrating an example of a signal path at the time of the operation of the radio-frequency circuit 201 according to the present embodiment in the single transmission mode. FIG. 7 illustrates an exemplary case where the transmission of a radio-frequency signal in Band B2 is performed (specifically, a signal path passing through the duplexer 62 is used) like FIG. 3.

In the single transmission mode, the switch circuit 230 establishes conduction between the ports 31 and 32. At that time, the switch circuit 230 establishes non-conduction between the port 31 and each of the ports 33 and 34.

The antenna 2 (the antenna connection terminal 101) and the duplexer 62 are therefore connected via the signal path 91. A radio-frequency signal is transmitted through the signal path 91 on which no filter is disposed, and an insertion loss caused by a filter can therefore be reduced.

2-2-2. Radio-frequency Transmission Mode

Next, the simultaneous transmission mode will be described with reference to FIG. 8.

Figure 8:
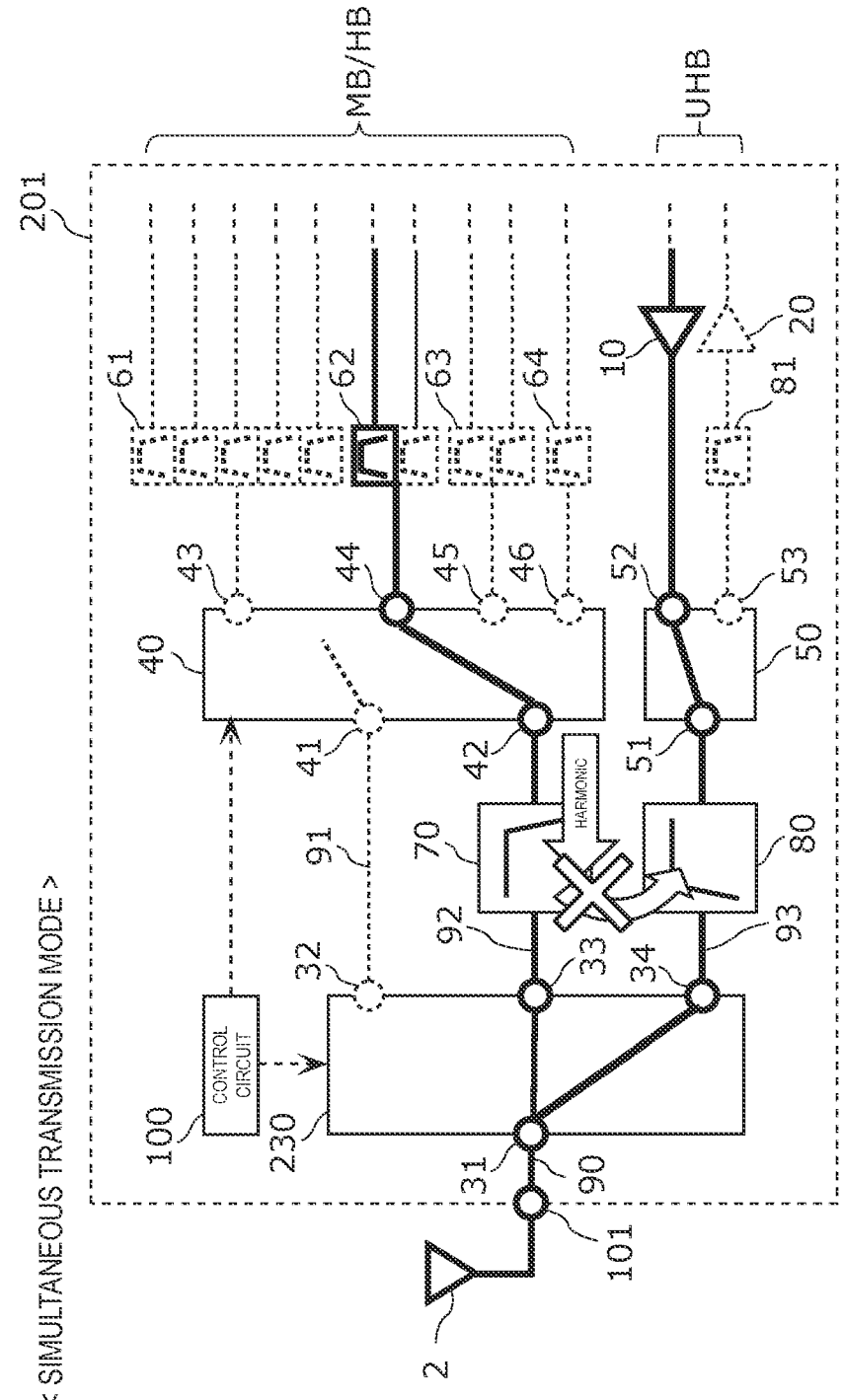
FIG. 8 is a circuit diagram illustrating an example of a signal path at the time of the operation of a radio-frequency circuit according to the second embodiment in the simultaneous transmission mode.

FIG. 8 is a circuit diagram illustrating an example of a signal path at the time of the operation of the radio-frequency circuit 201 according to the present embodiment in the simultaneous transmission mode. FIG. 8 illustrates an exemplary case where the simultaneous transmission (e.g., simultaneous sending) of radio-frequency signals in Bands B2 and n77 is performed like FIG. 4.

In the simultaneous transmission mode, the switch circuit 230 establishes conduction between the port 31 and each of the ports 33 and 34. There is no conduction between the ports 31 and 32. The switch circuit 50 establishes conduction between the ports 51 and 52.

The antenna 2 (the antenna connection terminal 101) and the duplexer 62 are therefore connected via the signal path 92. The antenna 2 (the antenna connection terminal 101) and the power amplifier 10 are connected. Accordingly, the transmission of a radio-frequency signal in Band B2 from the antenna 2 and the transmission of a radio-frequency signal in Band n77 from the antenna 2 can be simultaneously performed.

Since the low-pass filter 70 is disposed on the signal path 92, the low-pass filter 70 suppresses the passage of the harmonic of a radio-frequency signal in Band B2 passing through the duplexer 62. Accordingly, the turning of the harmonic to the signal path for the ultra-high band via the switch circuit 230 can be suppressed. Since the high-pass filter 80 is disposed on the signal path 93, the turning of, for example, a noise component included in a radio-frequency signal transmitted through the signal path 93 to the signal path for the middle-high band via the switch circuit 230 can be suppressed.

2-3. Effects

As described above, the radio-frequency circuit 201 according to the present embodiment includes only one antenna connection terminal.

When the simultaneous transmission port 42 is used, the antenna 2 is commonly used. That is, the conduction between the ports 33 and 34 is established via the port 31 in the switch circuit 230. The turning of a radio-frequency signal via the switch circuit 230 is therefore likely to occur. Accordingly, the effect of suppressing the passage of n-th harmonic by the use of the low-pass filter 70 is more useful. Since no filter is provided on the signal path 91, the insertion loss caused by a filter can be reduced when the single transmission port 41 is used. Thus, with the radio-frequency circuit 201, the deterioration of communication performance can be suppressed in both the case where the simultaneous transmission port 42 is used and the case where the single transmission port 41 is used.

For example, when the switch circuit 40 establishes conduction between the single transmission port 41 and at least one of the ports 43 to 46, the switch circuit 230 establishes conduction between the ports 31 and 32 and non-conduction between each of the ports 33 and 34 and the port 31. When the switch circuit 40 establishes conduction between the simultaneous transmission port 42 and at least one of the ports 43 to 46, the switch circuit 230 establishes conduction between the port 31 and each of the ports 33 and 34 and non-conduction between the ports 32 and 31.

Since the simultaneous transmission port 42 is used in the simultaneous transmission mode, the turning of a harmonic can be suppressed by the use of the low-pass filter 70. Since the single transmission port 41 is used in the single transmission mode, a radio-frequency signal is transmitted through the signal path 91 on which no filter is disposed and an insertion loss caused by a filter can be reduced.

For example, in the radio-frequency circuit 201, the third filter is disposed on the signal path 93 connecting the ports 34 and 51.

Since the high-pass filter 80 is disposed on the signal path 93, the turning of, for example, a noise component included in a radio-frequency signal transmitted through the signal path 93 to another signal path via, for example, the switch circuit 230 can be suppressed.

For example, the port 52 is connected to the power amplifier 10. The port 53 is connected to the low-noise amplifier 20. The radio-frequency circuit 201 further includes the filter 81 disposed between the port 53 and the low-noise amplifier 20.

The bandpass filter can remove a noise component included in a reception signal.

2-4. Modification

Next, the modification of the second embodiment will be described with reference to FIG. 9.

Figure 9:
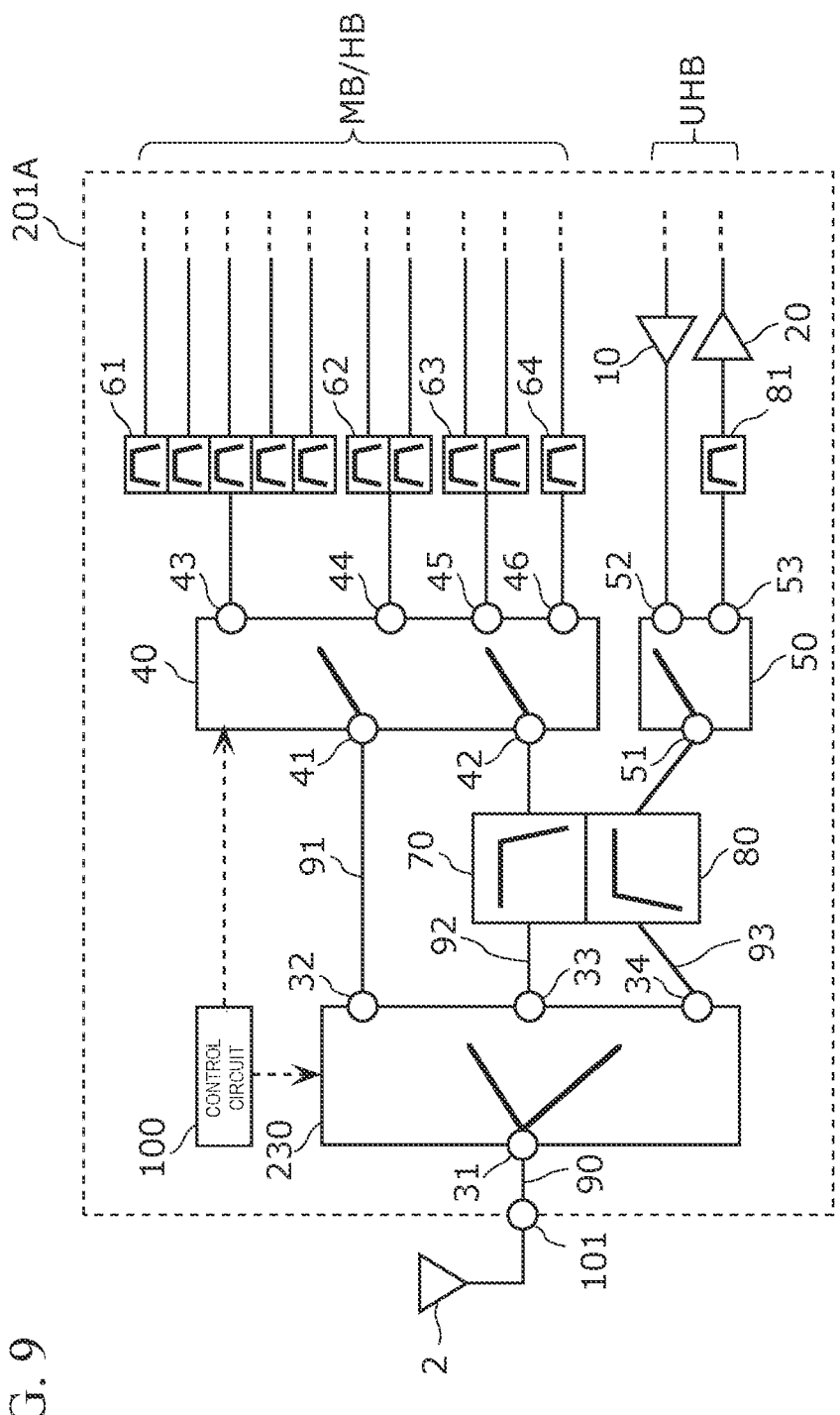
FIG. 9 is a circuit diagram of a radio-frequency circuit according to a modification of the second embodiment.

FIG. 9 is a circuit diagram of a radio-frequency circuit 201A according to the present modification. As illustrated in FIG. 9, the radio-frequency circuit 201A differs from the radio-frequency circuit 201 illustrated in FIG. 6 in that the low-pass filter 70 and the high-pass filter 80 are disposed on the same substrate. That is, the low-pass filter 70 and the high-pass filter 80 are formed of a one-chip component with two inputs and two outputs.

The radio-frequency circuit 201A can therefore be miniaturized.

(Others)

A radio-frequency circuit according to the present disclosure and a communication device according to the present disclosure have been described above on the basis of the above embodiments and the like, but the present disclosure is not limited to the above embodiments.

For example, the low-pass filter 70 does not necessarily have to have the whole of the ultra-high band as the stop band on condition that the passage of the harmonic of a radio-frequency signal in a communication band in the middle-high band transmitted in the simultaneous transmission mode can be suppressed. Accordingly, for example, each of the radio-frequency circuits 1, LA, 201, and 201A may include a band elimination filter instead of the low-pass filter 70. A band elimination filter has, as a stop band, a frequency band including n times the frequency included in a communication band in the middle-high band transmitted in the simultaneous transmission mode.

For example, a millimeter wave band 7 GHz and above may be used instead of the ultra-high band. For example, the low-pass filter 70 may have a millimeter wave band as a stop band and the high-pass filter 80 or the bandpass filter 82 may have a millimeter wave band as a passband.

For example, in the radio-frequency circuits 1, 201, and 201A, a filter may be disposed between the port 52 and the power amplifier 10. The filter is, for example, a bandpass filter having the same passband and the same stop band as the filter 81. Since a noise component generated in the power amplifier 10 can be removed, the deterioration of communication performance can be suppressed.

For example, the radio-frequency circuits 1, 1A, 201, and 201A may transmit radio-frequency signals in a plurality of communication bands in the ultra-high band. For example, a switch for switching between communication bands, a bandpass filter for Band n77, and a bandpass filter for Band n79 may be disposed on the signal path 93.

For example, in the circuit configurations of the radio-frequency circuits 1, 1A, 201, and 201A, other circuit elements, wiring lines, and so on may be provided between the paths connecting the respective circuit elements and the signal paths illustrated in the drawings.

Modes realized by making various modifications supposed by those skilled in the art to each embodiment and modes realized by optionally combining the constituent elements and the functions in each embodiment without necessarily departing from the scope of the present disclosure are also included in the present disclosure.

INDUSTRIAL APPLICABILITY

For example, the present disclosure is widely applicable for use in a communication device (e.g., a mobile phone) as a radio-frequency circuit disposed in a front-end portion.

REFERENCE SIGNS LIST 1, 1A, 201, and 201A radio-frequency circuit
2, 2a, and 2b antenna
3 RFIC
4 BBIC
5 communication device
10 power amplifier
20 low-noise amplifier
30, 40, 50, and 230 switch circuit
31, 31a, 31b, 32, 33, 34, 43, 44, 45, 46, 51, 52, and 53 port
41 single transmission port
42 simultaneous transmission port
61 multiplexer
62 and 63 duplexer
64 and 81 filter
70 low-pass filter
80 high-pass filter
82 bandpass filter
90, 90a, 90b, 91, 92, and 93 signal path
100 control circuit
101, 101a, and 101b antenna connection terminal

The invention claimed is:
1. A radio-frequency circuit comprising:
an antenna connection terminal;
a first switch circuit;
a second switch circuit;
a first filter having a passband comprising a first frequency band;
a second filter that has a passband comprising at least the first frequency band and has a stopband comprising a second frequency band, the second frequency band including a second frequency that is n times a first frequency in the first frequency band, n being a natural number greater than or equal to two; and
a third filter having a passband comprising a third frequency band, the third frequency band including the second frequency,
wherein the first switch circuit comprises a first port connected to the antenna connection terminal, and a second port, a third port, and a fourth port that are configured to selectively connect to the first port,
wherein the second switch circuit comprises a single transmission port connected to the second port, a simultaneous transmission port connected to the third port, and an input/output port configured to selectively connect to the single transmission port and the simultaneous transmission port,
wherein the first filter is connected to the input/output port,
wherein the second filter is in a first signal path that connects the third port and the simultaneous transmission port,
wherein the third filter is connected to the fourth port, and
wherein no filter is in a second signal path that connects the second port and the single transmission port.

2. The radio-frequency circuit according to claim 1, wherein the second filter is a low-pass filter or a band elimination filter.

3. The radio-frequency circuit according to claim 1,
wherein the radio-frequency circuit comprises a plurality of the antenna connection terminals,
wherein the first switch circuit comprises two first ports, and
wherein the plurality of antenna connection terminals include a first antenna connection terminal connected to one of the two first ports, and a second antenna connection terminal connected to the other one of the two first ports.

4. The radio-frequency circuit according to claim 3,
wherein, when the second switch connects the single transmission port to the input/output port, the first switch circuit connects one of the two first ports to the second port, and disconnects the third port and the fourth port from both of the two first ports, and
wherein, when the second switch circuit connects the simultaneous transmission port to the input/output port, the first switch circuit connects one of the two first ports to the third port, connects the other one of the two first ports to the fourth port, and disconnects the second port from both of the two first ports.

5. The radio-frequency circuit according to claim 3, wherein the third filter is a bandpass filter.

6. The radio-frequency circuit according to claim 5, further comprising a third switch circuit comprising a fifth port connected to the fourth port, and a sixth port and a seventh port that are configured to selectively connect to the fifth port,
wherein the third filter is in a third signal path that connects the fourth port and the fifth port.

7. The radio-frequency circuit according to claim 1, wherein the radio-frequency circuit comprises only the single antenna connection terminal.

8. The radio-frequency circuit according to claim 7,
wherein, when the second switch circuit connects the single transmission port to the input/output port, the first switch circuit connects the first port to the second port and disconnects the first port from each of the third port and the fourth port, and
wherein, when the second switch circuit connects the simultaneous transmission port to the input/output port, the first switch circuit connects the first port to each of the third port and the fourth port and disconnects the second port from the first port.

9. The radio-frequency circuit according to claim 1, wherein the third filter is a high-pass filter.

10. The radio-frequency circuit according to claim 9, further comprising a third switch circuit comprising a fifth port connected to the fourth port, and a sixth port and a seventh port that are configured to selectively connect to the fifth port,
wherein the third filter is in a third signal path that connects the fourth port and the fifth port.

11. The radio-frequency circuit according to claim 10,
wherein the sixth port is connected to a power amplifier,
wherein the seventh port is connected to a low-noise amplifier, and
wherein the radio-frequency circuit further comprises a fourth filter between the seventh port and the low-noise amplifier.

12. The radio-frequency circuit according to claim 9, wherein the second filter and the third filter are on the same substrate.

13. The radio-frequency circuit according to claim 1, wherein no multiplexer is in a signal path that connects the antenna connection terminal and the first port.

14. The radio-frequency circuit according to claim 1,
wherein the first frequency band is at least a part of a first communication band for frequency division duplex (FDD), and
wherein the third frequency band is a second communication band for time division duplex (TDD).

15. The radio-frequency circuit according to claim 1,
wherein the first frequency band is in a range below 3 GHz, and
wherein the second frequency band and the third frequency band are in a range above 3 GHz.

16. The radio-frequency circuit according to claim 1, wherein the first switch circuit, the second switch circuit, and the second filter are on the same substrate.

17. A communication device comprising:
a radio frequency (RF) signal processing circuit configured to process a radio-frequency signal transmitted/received by an antenna; and
the radio-frequency circuit according to claim 1, the radio-frequency circuit being configured to transmit the radio-frequency signal between the antenna and the RF signal processing circuit.

* * * * *